United States Patent [19]
Nelson et al.

[11] 3,829,676
[45] Aug. 13, 1974

[54] RECHARGEABLE FLASHLIGHT

[75] Inventors: Norman C. Nelson, Newberry Springs; Daniel C. Harley, Apple Valley, both of Calif.

[73] Assignee: Kel-Lite Industries, Inc., Barstow, Calif.

[22] Filed: Aug. 7, 1973

[21] Appl. No.: 386,366

[52] U.S. Cl. ......... 240/10.6 CH, 240/10.66, 320/28, 320/34, 320/47, 320/54
[51] Int. Cl. ............................. F21l 1/00, H02j 7/00
[58] Field of Search .... 240/10.6 R, 10.6 CH, 10.66, 240/10.68; 320/2, 28, 29, 34, 47, 54

[56] References Cited
UNITED STATES PATENTS

| | | | |
|---|---|---|---|
| 1,506,302 | 8/1924 | Hopkins | 240/10.6 CH |
| 2,143,558 | 1/1939 | Joers | 240/10.66 |
| 2,518,039 | 8/1950 | Malki et al. | 240/10.6 CH |
| 2,666,894 | 1/1954 | Babernitsh | 240/10.68 X |
| 2,830,280 | 4/1958 | Webber | 240/10.6 CH X |
| 2,848,598 | 8/1958 | Amlee | 240/10.66 |
| 3,005,090 | 10/1961 | Moore | 240/10.6 CH |
| 3,261,973 | 7/1966 | Kott | 240/10.66 |
| 3,281,637 | 10/1966 | Hultguist | 240/10.66 X |
| 3,521,050 | 7/1970 | Shagena Jr. | 240/10.66 |
| 3,643,083 | 2/1972 | Heine | 240/10.6 CH |

*Primary Examiner*—Joseph F. Peters, Jr.

[57] ABSTRACT

A flashlight is provided with batteries that are capable of being recharged, and the flashlight is constructed in such a way that the recharging of the batteries may be accomplished without removing them.

Bulb and reflector means are provided at one end of the battery train, and a normally compressed spring engages the other end of the battery train in order to support the batteries and also carry discharge current flowing from the batteries into the bulb.

Means are also provided for further compressing the spring so as to open up the discharge circuit, providing a pair of inputs for charging the batteries. The mechanism for further compressing the spring, and for connecting the charging circuit to the pair of inputs thus created, is contained within the rearward portion of the flashlight housing.

6 Claims, 11 Drawing Figures

PATENTED AUG 13 1974 3,829,676

RECHARGEABLE FLASHLIGHT

BACKGROUND OF THE INVENTION

The present invention is based upon a realization that it would be desirable to have a flashlight which can be conveniently recharged.

According to the present invention it is not necessary to remove the batteries from the flashlight in order to recharge them, nor is it necessary to even partially disassemble or modify the flashlight.

The novel flashlight of the present invention is adapted to be recharged by means of a novel holder and charger which is the subject of a separate application of the same applicants, which application is filed concurrently with this application and is assigned to the same assignee as this application.

DRAWING SUMMARY

PREFERRED EMBODIMENT

Reference is made to FIGS. 1 through 6, inclusive, illustrating the presently perferred form of the invention.

Figure 1:
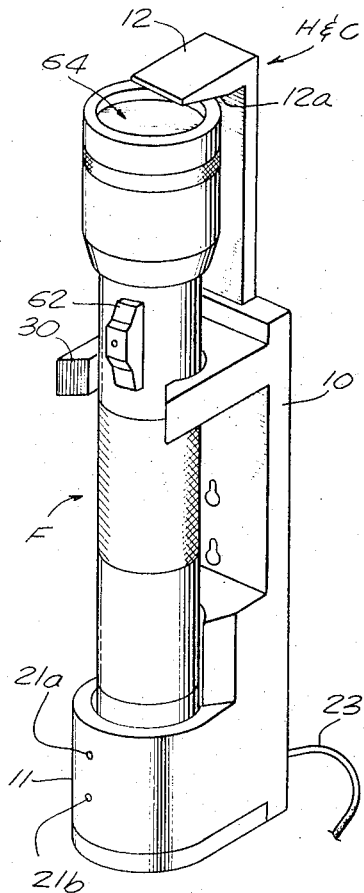
FIG. 1 is a perspective view of the presently preferred form of the rechargeable flashlight when supported in a holder and charger.
Figure 2:
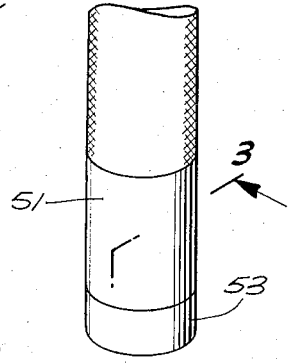
FIG. 2 is a perspective view of the rearward end of the flashlight.

In FIG. 1 a flashlight F is supported in a holder and charger H & C. Holder and charger H & C is described in greater detail in our concurrently filed application, referred to above, but will be briefly described here as well.

An elongated frame 10 has a lower end 11 and an upper end 12 which project laterally outward. The two ends of the flashlight are grasped between the frame ends 11 and 12. Frame lower end 11 has an upper recessed surface 11a (FIG. 6) which receives the lower end or tail cap of the flashlight. Frame upper end 12 has a sloped under surface 12a which provides a cam action when the flashlight is inserted. The lower end of the flashlight is inserted first, and then the upper or bulb end is moved laterally beneath the frame upper end 12, and the resulting cam action drives the lower end tightly downward against the recessed surface 11a.

Intermediate the length of frame 10 is a finger 30 which graspes flashlight F at an intermediate point along its length. Frame lower end 11 houses a charging circuit 21 (not specifically shown) which is powered from a power cord 23. Charging circuit 21 includes a pair of indicator lights 21a, 21b which indicate the operating condition of the circuit. It also includes an electrical plug 22 shown in FIG. 6.

The plug 22 includes a rigid inner conductor 22a and a rigid outer conductor 22c which is concentrically disposed about the inner conductor. The two conductors are separated by a generally cylindrical insulator 22b. A flat circular insulating plate 11b is supported in the upper portion of the frame lower end 11 and provides the recessed surface 11a. There is a central opening in the insulator plate 11b and all three portions of plug 22 project upward through that central opening. The outer conductor 22c has a truncated conical face which projects above the insulator plate 11b. Beyond the outer conductor 22c the insulator 22b has an enlarged diameter. The outer end of its inner conductor 22a is enlarged above the insulator 22b to form a flat circular face of electrically conductive metal.

Flashlight F includes an elongated metal housing 50 having a generally cylindrical configuration. A battery train including one or more batteries 60 (FIG. 3) is contained within the housing, and particularly within the casing portion 51 thereof. A switch 62 mounted on the outside of the casing is used to selectively connect the battery train to bulb and reflector means 64 located in conventional fashion at the upper or forward end of the flashlight.

At the rearward or lower end of the flashlight there is a metal tail cap 53 having a generally cup-shaped configuration. The upper circumferential wall of tail cap 53 is exteriorly threaded so as to engage interior threads on the lower or rearward end of casing 51. The lower or bottom wall 53a of tail cap 53 has a central opening 53b formed therein.

Figure 6:
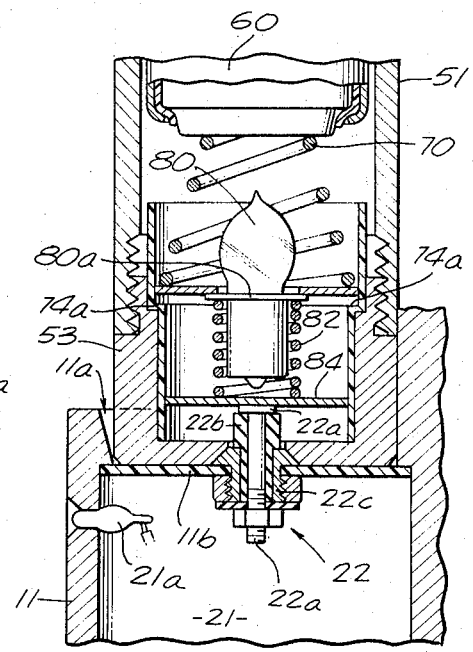
FIG. 6 is a longitudinal cross-sectional view of the rearward end portion of the flashlight and the adjoining part of the charger.
Figure 7:
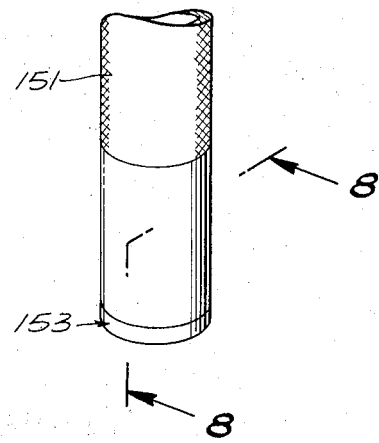
FIG. 7 is a perspective view of the rearward end of another form of the flashlight in accordance with the invention.

The opening 53b is not cylindrical, but has a truncated conical configuration and is of the same diameter as the conical face of the outer conductor 22c of plug 22. Thus as shown in FIG. 6 the inner conductor 22a and insulator 22b may be inserted through the opening 53b, and outer conductor 22c is then received in the opening 53a and makes electrically conductive engagement with tail cap 53.

A normally compressed spring 70 has its upper end conductively engaging the lower end of battery 60, while the lower end of spring 70 is supported on a spring retainer plate 72. Spring 70 serves the dual functions of supporting the battery or batteries 60 in position and providing a current path for the discharge current from the batteries to energize the bulb means 64. In addition, in accordance with the present invention the spring 70 forms part of a switching mechanism for interrupting the discharge circuit and connecting a charging circuit to the battery or batteries 60.

Spring retainer plate 72 may if desired be received within the lowermost end of tail cap 53, and spring 70 made of an appropriate corresponding length. In that event the insertion of plug 22 would cause inner conductor 22a to engage spring retainer plate 72 and thereby break its contact with tail cap 53.

However, in the preferred embodiment of the invention as presently illustrated, the tail cap 53 is also utilized as a storage facility for storing a reserve or extra flashlight bulb 80. A generally cylindrical insulator 74 fits within the interior of tail cap 53, and the upper end portion of insulator 74 is of wider diameter than the lower portion with the result that a circumferential interior shoulder 74a is provided. Spring retainer plate 72 rests upon the shoulder 74a. A central opening (FIG. 5) is provided in the retainer plate 72. Bulb 80 has a supporting base with circumferential flange 80a which is disposed beneath the retainer plate 72, while the glass portion of the bulb projects upward through the opening 72a and above the plate 72 into the area within the interior of coil spring 70.

Figure 3:
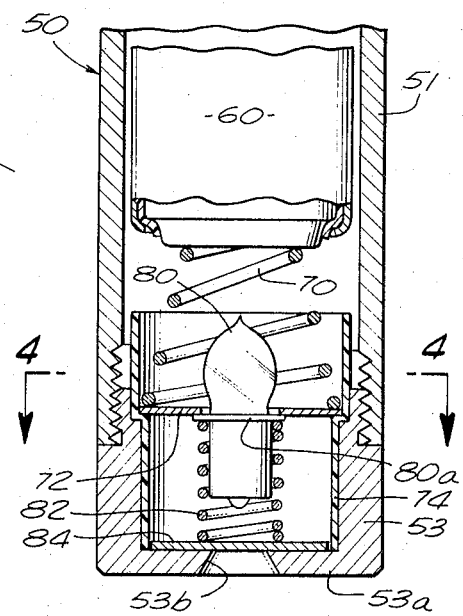
FIG. 3 is a longitudinal cross-sectional view taken on line 3—3 of FIG. 2.
Figure 4:
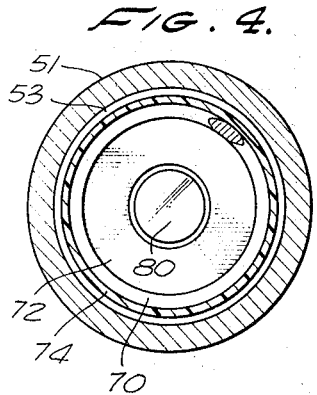
FIG. 4 is a transverse cross-sectional view taken on line 4—4 of FIG. 3.
Figure 5:
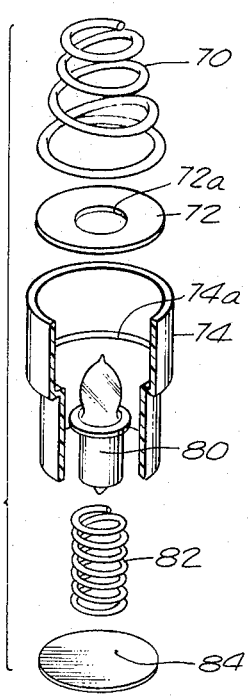
FIG. 5 is an exploded perspective view of some interior parts of the flashlight.

A circular metal contact plate 84 normally rests upon the upper surface of the bottom wall 53a of tail cap 53 (FIG. 3). A bulb spring 82 is of the normally compressed variety and has its lower end resting upon contact plate 84 while its upper end surrounds the base of bulb 80 and engages the under surface flange 80.

FIG. 3 shows the position of the parts when the flashlight F is operating, i.e., the batteries are being discharged in order to illuminate the bulb and reflector means 64. The reserve or extra bulb 80 is then not in the circuit, but its supporting flange 80a is included as part of the circuit. Current flows from battery spring 70, spring retainer plate 72, reserve bulb support flange 80a, bulb spring 82, and contact plate 84, into tail cap 53. It then flows through casing 51 to the forward end of metal housing 50 where, controlled by switch 62, it selectively energizes the bulb and reflector means 64.

FIG. 6 shows the position of the parts when the flashlight F is being charged by the holder and charger H & C. The changes are as follows: Contact plate 84 is moved up so that it no longer engages the bottom wall of tail cap 53. The lower portion of insulator 74 separates the contact plate 84 from the circumferential sidewall of the tail cap. Spring retainer plate 72 may be in the same position as before, but preferably moves upward a short distance due to the greater compressive force that is applied to spring 70. Bulb spring 82 is necessarily shortened by the upward movement of contact plate 84.

Thus it will be seen that the insertion of charger plug 22 through the opening 53b causes the internal contacts 84, 53a to open, thus breaking the discharge circuit of the batteries, and at the same time providing a pair of input terminals for charging the batteries. Outer conductor 22c of the charger plug 22 engages contact member 53a of the flashlight, while inner conductor 22a of the charger plug engages the movable plate 84.

ALTERNATE FORM

Reference is now made to FIGS. 7 through 11, inclusive, illustrating an alternate form of our invention. A metal casing 151 has its rearward end closed by a tail cap 153. Compressed spring 170 supports the lower end of battery 60. The lower end of spring 170 rests, in turn, upon the circumferential edge of a spring retainer plate 172. A circular insulator 174 has an L-shaped radial cross-section, and is upwardly turned to form a support ring for the lower end of spring 170 as well as for the circumferential edge of retainer plate 172.

Some distance above the bottom wall 153a of tail cap 153 a circumferential interior shoulder 153c is formed which faces upwardly. A circular metal contact plate 184 rests on the shoulder 153c. Contact plate 184 has a central opening 184a therein. Insulator ring 174 rests on the plate 184.

Figure 8:
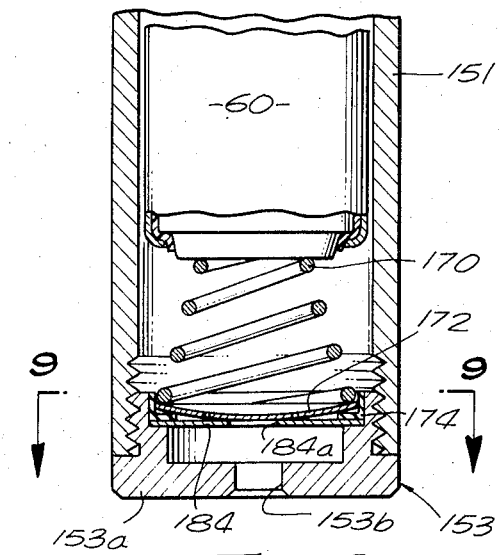
FIG. 8 is a longitudinal cross-sectional view taken on line 8—8 of FIG. 7.
Figure 9:
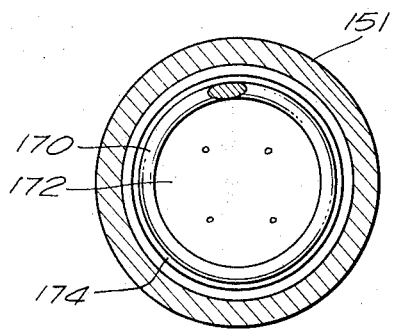
FIG. 9 is a transverse cross-sectional view taken on line 9—9 of FIG. 8.
Figure 10:
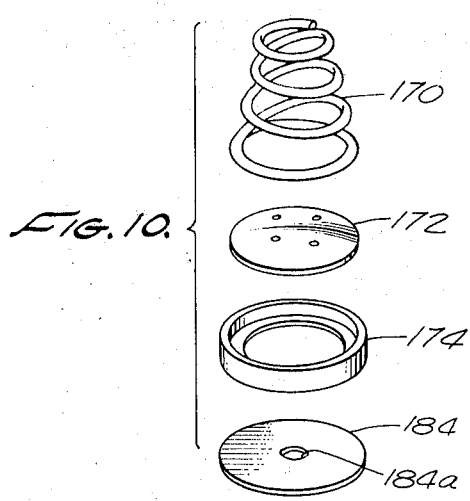
FIG. 10 is an exploded perspective view of some of the interior parts of the flashlight of FIG. 7.

FIG. 8 shows the position of the parts when the flashlight is operating, i.e., current discharged from battery 60 flows to the bulb. This result is made possible by the fact that spring retainer plate 172 is radially curved, with its central portion normally being at a much lower elevation than its circumferential portion. Current then flows from battery 60 through spring 170 retainer plate 172, contact plate 184, tail cap 153, and casing 151.

Figure 11:
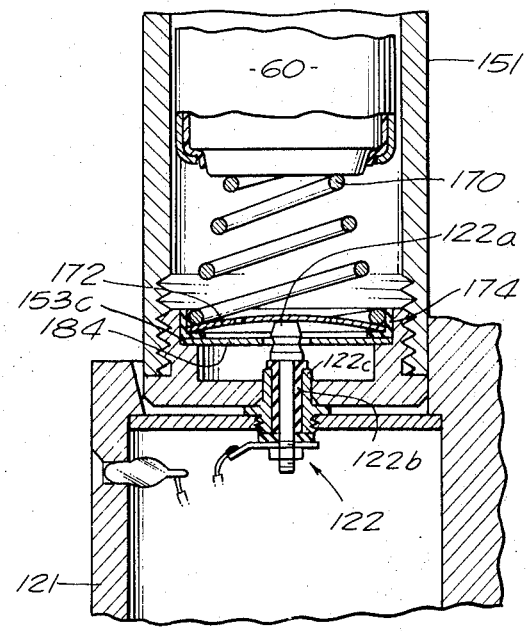
FIG. 11 is a longitudinal cross-sectional view of the rearward end portion of the flashlight of FIG. 7 and adjoining portion of the charger.

FIG. 11 shows the position of the parts when the batteries are being charged. A charger plug 122 has a configuration suitable for cooperation with the battery mechanism just described. An outer conductor 122c passes through opening 153b in the bottom wall 153a of tail cap 153, and conductively engages the peripheral wall thereof. Insulator 122b and inner conductor 122a project well above the bottom wall 153b. Inner conductor 122a projects through opening 184a of contact plate 184, but being significantly smaller than the opening it does not make electrically conductive engagement with the plate 184. The upper flat end of conductor 122a engages the undersurface of the central portion of spring retainer plate 172, raising it upward and flexing it in a radial direction, so that it no longer engages the contact plate 184.

It is therefore seen that insertion of the charger plug 122 serves to disconnect contact 172 from contact 184. In the charger circuit the element 184 is not used as a contact. Conductor 122b engages tail cap 153 while conductor 122a engages retainer plate 172. Tail cap 153 and retainer plate 172 are the input terminals of the circuit for charging the batteries.

While our invention has been disclosed in considerable detail in one of its forms in order to comply with the requirements of the Patent Laws, it will nevertheless be understood that the breadth and scope of our invention is to be limited only in accordance with the following claims.

We claim:

1. A rechargeable flashlight comprising:
a rechargeable battery;
a normally compressed spring conductively coupled to one end of said battery, and forming part of a current discharge circuit; and
selectively operable means adapted to further compress said spring so as to open up the discharge circuit, the point at which the discharge circuit is opened then providing two inputs for a battery charging circuit.

2. The flashlight of claim 1 wherein said selectively operable means is a spring retainer plate which engages one end of said spring.

3. The flashlight of claim 2 wherein said spring retainer is a circular plate which is radially curved and is resiliently deformable so as to reverse the longitudinal position of its center relative to its periphery.

4. The flashlight of claim 2 which includes a metal casing within which said battery is disposed, and a metal tail cap removably attached to one end of said casing and within which said spring retainer is received; said tail cap having an opening therein for insertion of a charger jack.

5. The flashlight of claim 4 which further includes a metal contact plate disposed within said tail cap, and a reverse bulb disposed between said spring retainer and said contact plate and providing conductive coupling therebetween; said contact plate being engageable by the charger jack.

6. In combination, a rechargeable flashlight and a recharger for same, characterized in that:
   said flashlight includes a metal housing, a movable contact plate disposed within the rearward end of said housing, and spring means normally holding said contact plate in conductive engagement with said housing end;
   said housing end has an opening adapted for insertion of an electrical plug;
   said recharger includes an associated holder having two ends between which the ends of said flashlight are grasped; and
   one of said holder ends having an electrical plug protruding therefrom, and the other of said holder ends having cam means for forcing said housing rearward end against said plug to thereby force said contact plate out of engagement with said housing end;
   whereby said housing end and contact plate form the inputs of a charging circuit that is powered through said plug.

* * * * *